US012756107B2

(12) United States Patent
Kambara et al.

(10) Patent No.: US 12,756,107 B2
(45) Date of Patent: Oct. 6, 2026

(54) ELECTROMAGNETIC WAVE REFLECTING DEVICE, ELECTROMAGNETIC WAVE REFLECTING FENCE, AND REFLECTION PANEL

(71) Applicant: AGC Inc., Tokyo (JP)

(72) Inventors: Kumiko Kambara, Tokyo (JP); Shinji Ueki, Tokyo (JP)

(73) Assignee: AGC INC., Tokyo (JP)

( * ) Notice: Subject to any disclaimer, the term of this patent is extended or adjusted under 35 U.S.C. 154(b) by 30 days.

(21) Appl. No.: 18/963,018

(22) Filed: Nov. 27, 2024

(65) Prior Publication Data

US 2025/0096480 A1 Mar. 20, 2025

Related U.S. Application Data

(63) Continuation of application No. PCT/JP2023/016402, filed on Apr. 26, 2023.

(30) Foreign Application Priority Data

Jun. 1, 2022 (JP) ................................. 2022-089849

(51) Int. Cl.
*H01Q 15/14* (2006.01)

(52) U.S. Cl.
CPC .................................. *H01Q 15/14* (2013.01)

(58) Field of Classification Search
CPC . H01Q 15/14; H01Q 15/0026; H01Q 15/0086
See application file for complete search history.

(56) References Cited

U.S. PATENT DOCUMENTS

2012/0113502 A1* 5/2012 Suh ..................... B81C 1/00111 216/13
2018/0059506 A1 3/2018 Lee et al.
2023/0010669 A1* 1/2023 Kambara ............... H01Q 19/18

FOREIGN PATENT DOCUMENTS

WO WO-2021/199504 A1 10/2021

OTHER PUBLICATIONS

Diaz-Rubio et al., "From the generalized reflection law to the realization of perfect anomalous reflectors," Science Advances, vol. 3, Aug. 11, 2017, pp. e1602714-1 to e1602714-10.

(Continued)

*Primary Examiner* — David E Lotter
(74) *Attorney, Agent, or Firm* — Foley & Lardner LLP

(57) ABSTRACT

An electromagnetic wave reflecting device includes: a reflection panel configured to reflect radio waves of a desired band selected from a frequency band between 1 GHz and 170 GHz; and a frame configured to hold the reflection panel. The reflection panel includes: a dielectric layer; a conductive pattern periodically provided on one surface of the dielectric layer; a ground layer provided on the other surface of the dielectric layer; and an adhesive layer configured to bond the conductive pattern to the one surface of the dielectric layer, and a gap is provided in the adhesive layer.

11 Claims, 11 Drawing Sheets

(56) References Cited

OTHER PUBLICATIONS

Diaz-Rubio et al., "Supplementary Materials for: From the generalized reflection law to the realization of perfect anomalous reflectors," Science Advances, vol. 3, Aug. 11, 2017, e1602714 (15 pages).
International Searching Authority, "International Search Report," issued in connection with International Patent Application No. PCT/JP2023/016402, dated Jul. 18, 2023.
International Searching Authority, "Written Opinion," issued in connection with International Patent Application No. PCT/JP2023/016402, dated Jul. 18, 2023.

* cited by examiner

ELECTROMAGNETIC WAVE REFLECTING DEVICE, ELECTROMAGNETIC WAVE REFLECTING FENCE, AND REFLECTION PANEL

CROSS-REFERENCE TO RELATED APPLICATIONS

This application is a continuation application of International Application No. PCT/JP2023/016402 filed on Apr. 26, 2023, and designated the U.S., which is based upon and claims priority to Japanese Patent Application No. 2022-089849 filed on Jun. 1, 2022, the entire contents of which are incorporated herein by reference.

TECHNICAL FIELD

The present invention relates to an electromagnetic wave reflecting device, an electromagnetic wave reflecting fence, and a reflection panel.

BACKGROUND

While high-speed and large-capacity communication is expected in the fifth-generation (hereinafter "5G") mobile communication standard, there may be places where radio waves are difficult to reach due to a use of radio waves having high straight-line propagation properties. A means for delivering radio waves to a target terminal device or radio equipment is demanded in a place where many metal machines exist, such as a factory, or in a place where there are many reflections on wall surfaces or roadside trees, such as a street high-rise office building. A similar demand exists in a non-line-of-sight (NLOS) spot where no sight of a base station antenna can be obtained occurs, such as a medical site, an event venue, large commercial facilities, and the like.

In recent years, reflective surfaces with artificial surfaces called "metasurfaces" have been developed. A metasurface consists of a periodic structure or pattern finer than a wavelength, and is designed to reflect radio waves in a desired direction (for example, see Diaz-Rubio et al., Sci. Adv. 2017:3: e1602714 1). A metasurface itself is realized by a periodically repeated fine structure or metal pattern; in actual manufacturing of metasurfaces, a metal pattern is often provided on one surface of a dielectric substrate, and a ground layer is often provided on the opposite surface. Since the metasurface can realize a desired reflection angle and maintain a planar arrangement configuration at the same time, the metasurface effectively functions as a reflector even in an environment where there is no spatial margin for installing a large number of electromagnetic wave reflection panels.

A metal pattern and a ground layer are often made of a metal having good conductivity, such as copper (Cu), nickel (Ni), or silver (Ag). A reflective surface including a metasurface functions through its metal pattern and therefore requires precise patterning. A ground layer is formed on one surface of a dielectric substrate through a process such as sputtering or vapor deposition. A metal pattern may be formed through etching, electroplating, or the like.

SUMMARY

According to one embodiment, an electromagnetic wave reflecting device includes a reflection panel configured to reflect radio waves in a desired band selected from a band of frequencies equal to or higher than 1 GHz and equal to or lower than 170 GHz, and a frame configured to hold the reflection panel, wherein the reflection panel includes: a dielectric layer; a conductive pattern periodically provided on one surface of the dielectric layer; a ground layer provided on the other surface of the dielectric layer; and an adhesive layer configured to bond the conductive pattern to the one surface of the dielectric layer, and a gap is provided in the adhesive layer.

DETAILED DESCRIPTION

It is not easy to directly form a metal pattern through patterning on one surface of a dielectric substrate whose other surface is formed with a metal ground layer. Bonding a metal pattern to a dielectric substrate with an adhesive layer being interposed therebetween can be considered. In the reflective surface in which the metal pattern is bonded by the adhesive layer, the dielectric constant of the dielectric substrate and the adhesive layer greatly affects the reflection angle and the reflection efficiency. In order to improve the propagation environment, the reflection efficiency is preferably 60% or more, or 70% or more.

The inventors have found that deterioration in reflection efficiency can be suppressed more by providing a gap in an adhesive film than by disposing a conductive pattern on an adhesive film covering the entire surface of a dielectric substrate. An object of the present invention is to suppress deterioration in reflection efficiency in an electromagnetic wave reflecting device having a metal pattern bonded by an adhesive layer.

Deterioration in reflection efficiency in an electromagnetic wave reflecting device having a metal pattern bonded by an adhesive layer can be suppressed.

In order to improve a propagation environment by using an electromagnetic wave reflecting device, it is desirable that reflection efficiency of the electromagnetic wave reflecting device is 60% or more, preferably 70% or more. In the embodiment, in order to suppress deterioration in the reflection efficiency of the electromagnetic wave reflecting device, a gap is provided in the adhesive layer that bonds the conductive pattern to the dielectric layer. The term "gap" refers to a portion where the adhesive layer partially discontinues, and may be any form or shape, such as a groove, a trench, or an opening. In other words, the adhesive layer for bonding the conductive pattern does not cover the entire surface of the dielectric layer, and at least a part of the adhesive layer discontinues. Deterioration in reflection efficiency of an electromagnetic wave reflecting device is suppressed by setting the occupancy of an adhesive layer to a dielectric layer within a predetermined range.

Figure 1:
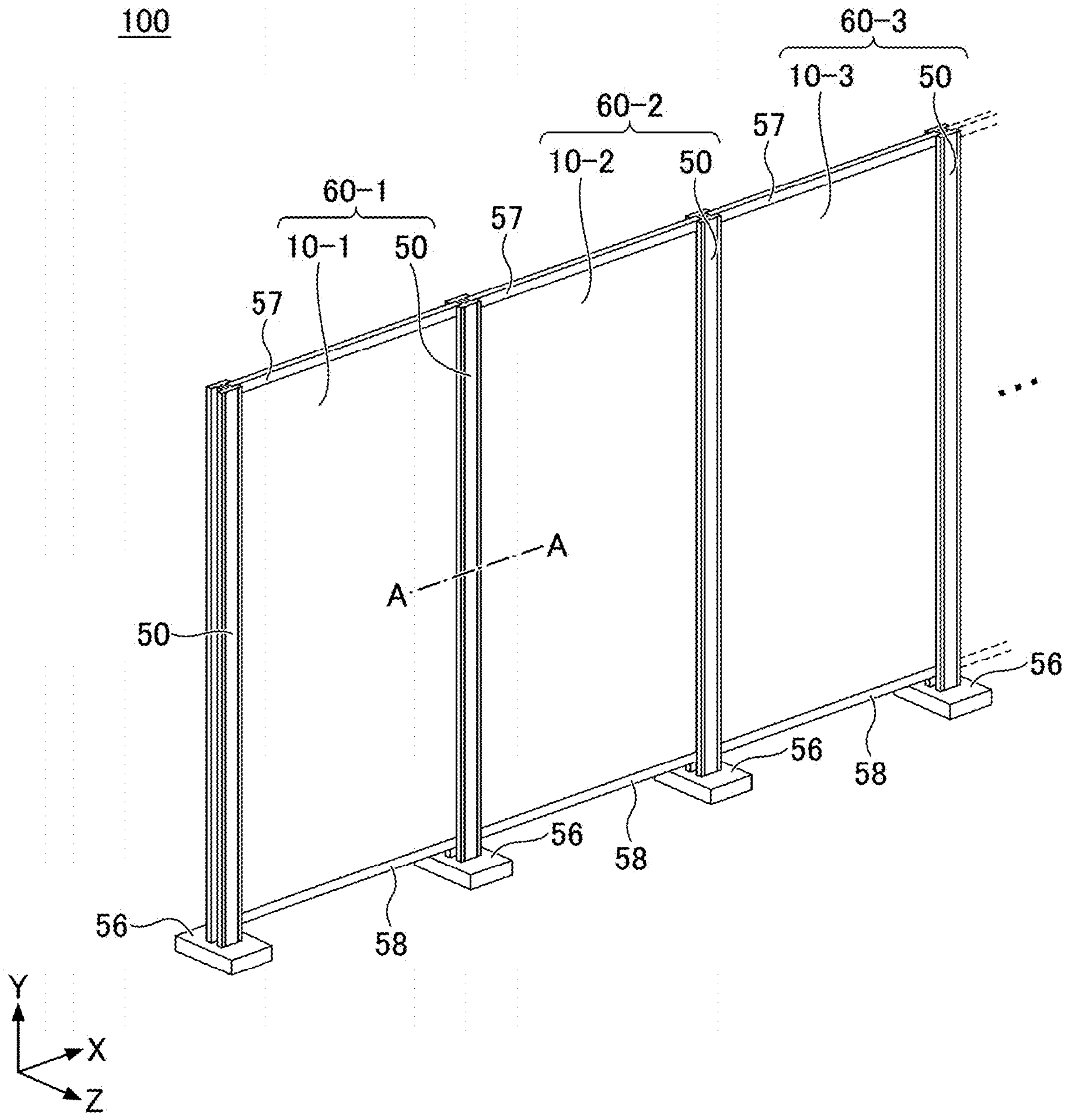
FIG. 1 is a schematic diagram of an electromagnetic wave reflecting fence in which a plurality of electromagnetic wave reflecting devices are joined.

FIG. 1 is a schematic diagram of an electromagnetic wave reflecting fence 100 in which a plurality of electromagnetic wave reflecting devices 60-1, 60-2, and 60-3 are joined. Although FIG. 1 illustrates the electromagnetic wave reflecting fence 100 configured by three electromagnetic wave reflecting devices 60-1, 60-2, and 60-3 joined to each other (hereinafter, they may be collectively referred to as "electromagnetic wave reflecting devices 60" as appropriate), the number of the electromagnetic wave reflecting devices 60 to be joined is not particularly limited.

The electromagnetic wave reflecting devices 60-1, 60-2, and 60-3 include reflection panels 10-1, 10-2, and 10-3 (hereinafter, they may be collectively referred to as "reflection panels 10" as appropriate), respectively. The width direction, the height direction, and the thickness direction of the reflection panel 10 are defined as X, Y, and Z directions, respectively. Each of the reflection panels 10 reflects electromagnetic waves of 1 GHz or more and 170 GHz or less, preferably 1 GHz or more and 100 GHz or less, and more preferably 1 GHz or more and 80 GHz or less. Each of the reflection panels 10 has, as a reflection film, a conductive pattern or a conductive film designed according to a target reflection mode, a target frequency band, or the like. The conductive film may be formed in a periodic pattern, a mesh pattern, a geometric pattern, a transparent film, or the like. As described later, the deterioration in reflection efficiency of the electromagnetic wave reflecting device 60 is suppressed by providing a gap in the adhesive layer that bonds the conductive pattern on the reflection panel 10-1.

Each of the reflection panels 10-1, 10-2, and 10-3 may have a specular reflection surface in which an angle of incidence and an angle of emergence of the electromagnetic wave are equal, or may be a non-specular reflection surface in which an angle of incidence and an angle of reflection are different from each other. The non-specular reflection surface includes a metasurface which is an artificial reflection surface designed to reflect radio waves in a desired direction, in addition to a diffusion surface and a scattering surface.

In some cases, from the viewpoint of maintaining continuity of a reflection potential, the reflection panels 10-1, 10-2, and 10-3 are preferably electrically connected to each other; in the case where the neighboring reflection panels 10 include a metasurface, on the other hand, electrical connections between the neighboring reflection panels 10 may be unnecessary. The neighboring reflection panels 10 are held and connected in the X direction by the frames 50, and an electromagnetic wave reflecting fence 100 is thereby obtained.

The electromagnetic wave reflecting device 60 may include legs 56 for supporting the frame 50 in addition to the reflection panel 10 and the frame 50. As illustrated in FIG. 1, in order to set the electromagnetic wave reflecting device 60 or the electromagnetic wave reflecting fence 100 upright on the installation surface, it is desirable to provide the legs 56, but the legs 56 are not essential. In addition to the frame 50, a top frame 57 for holding the upper end of the reflection panel 10 and a bottom frame 58 for holding the lower end of the reflection panel 10 may be used. In this case, the frame 50, the top frame 57, and the bottom frame 58 constitute a frame that holds the entire periphery of the reflection panel 10. The frame 50 may be referred to as a "side frame" due to its positional relationship with respect to the top frame 57 and the bottom frame 58. Provision of the top frame 57 and the bottom frame 58 ensures the mechanical strength and safety of the reflection panel 10 during transportation and assembly. Depending on purpose of use, the electromagnetic wave reflecting device 60 may be installed on a wall surface or a ceiling, with the reflection panel 10 being held by the frame 50, the top frame 57, and the bottom frame 58.

Figure 2:
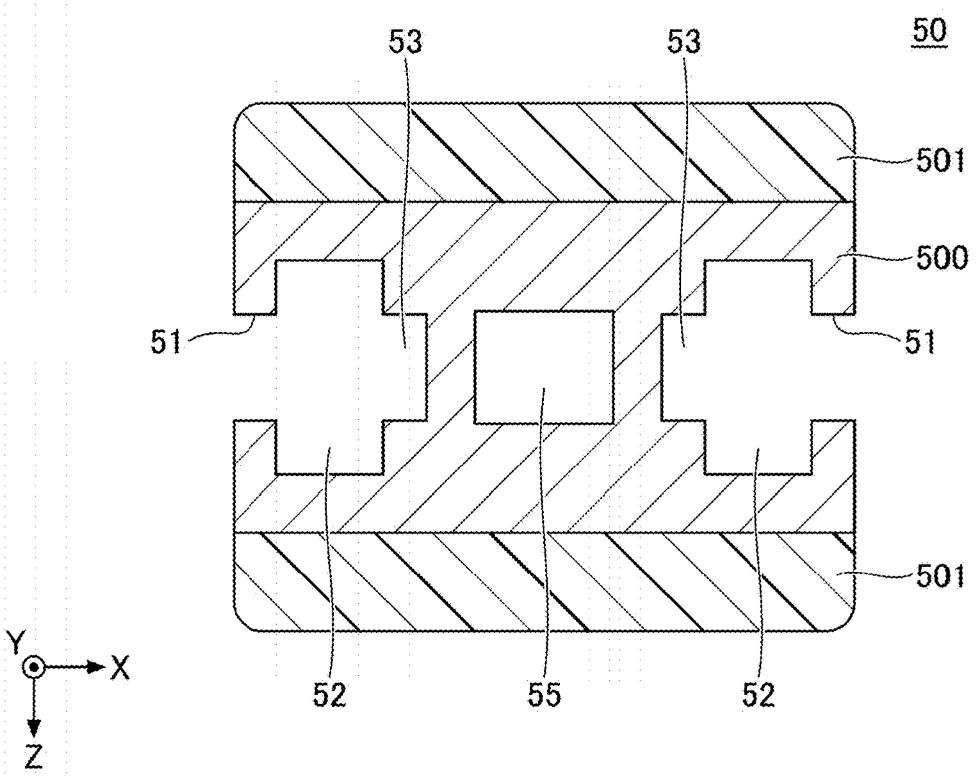
FIG. 2 is a horizontal cross-sectional view of a frame taken along line A-A of FIG. 1.

FIG. 2 is a cross-sectional view of the frame 50 taken along line A-A of FIG. 1, viewed in the section parallel to the XZ plane. The frame 50 includes a conductive main body 500 and slits 51 formed on both sides of the main body 500 in the width direction. The slits 51 hold the side edges of the reflection panel 10. The side edge of the reflection panel 10 is an edge along the Y direction in FIG. 1.

The main body 500 is provided with a cavity 52 communicating with the slit 51, a groove 53 provided in the cavity 52, and a hollow 55 not communicating with the cavity 52 and the groove 53; however, the present invention is not limited to this example. The groove 53 is provided at a position facing the slit 51 with the cavity 52 interposed therebetween, and holds the side edge of the reflection panel 10 inserted through the slit 51. The weight of the frame 50 can be reduced by providing the cavity 52 and the hollow 55 in the frame 50. Provision of the groove 53 in the cavity 52 reinforces the retention of the reflection panel 10.

A non-conductive cover 501, such as a resin-made cover, may be provided on the outer surface of the main body 500 but the cover 501 is not essential. In the case where the cover 501 is provided, the cover 501 functions as a protection member that protects the frame 50.

Figure 3:
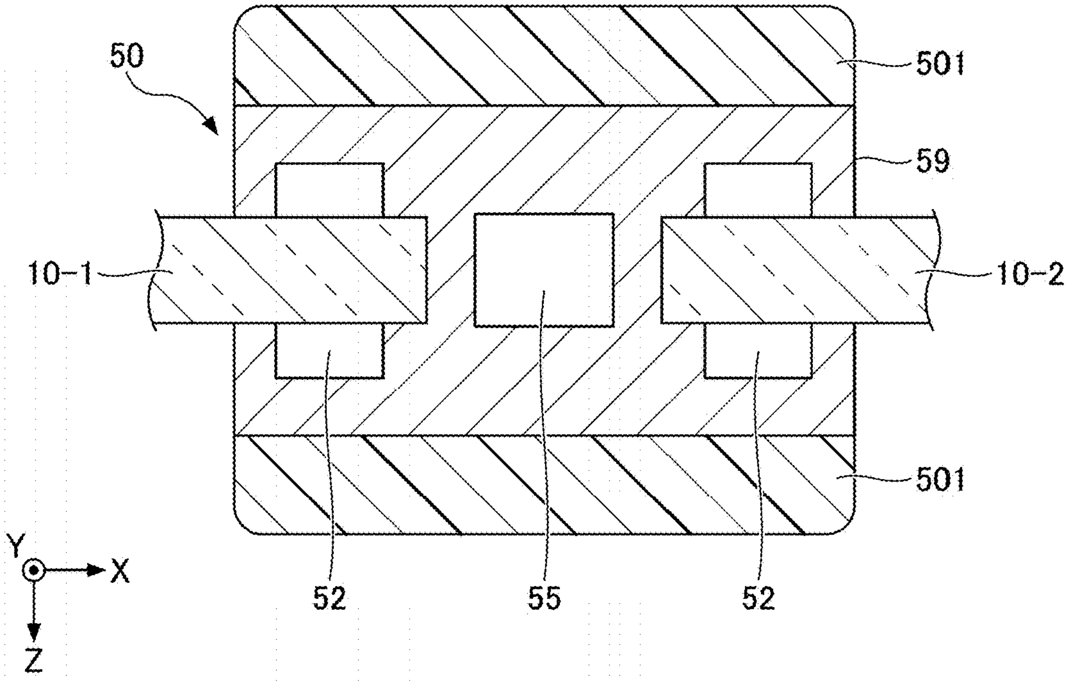
FIG. 3 is a diagram illustrating a state in which a panel is inserted into the frame of FIG. 2.

FIG. 3 is a cross-sectional view parallel to the XZ plane, illustrating the state of insertion of the reflection panel 10 into the frame 50. The reflection panels 10-1 and 10-2 are inserted from the slits 51 (see FIG. 2) on both sides of the main body 500. The reflection panels 10-1 and 10-2 may or may not contact the bottom surface of the groove 53 by being inserted into the groove 53 (see FIG. 2) of the cavity 52 to the depth. The reflection panels 10-1 and 10-2 are inserted into the slits 51, respectively, so that the neighboring reflection panels 10-1 and 10-2 can be stably held. The main body 500 may be partially made of a non-conductive material.

Figure 4A:
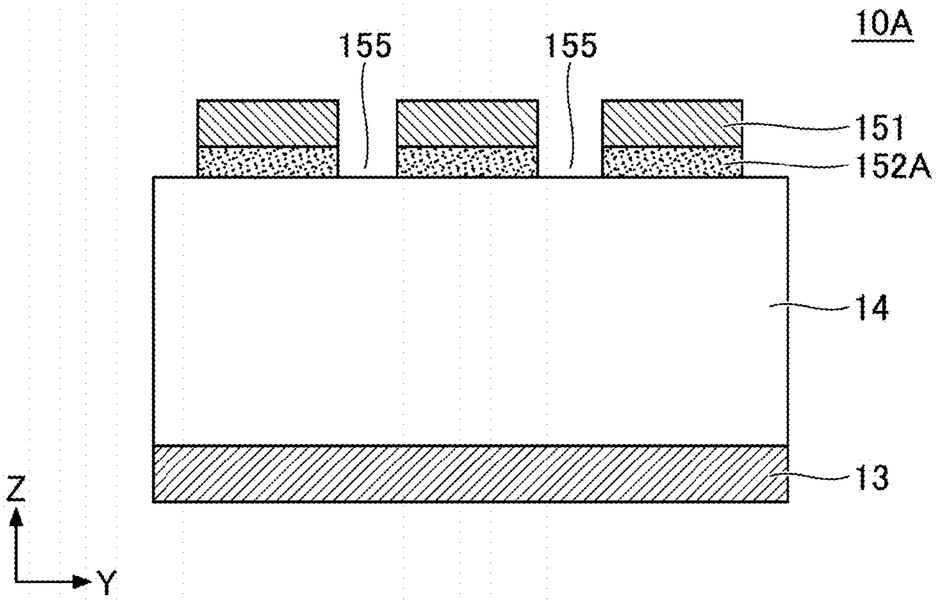
FIG. 4A is a diagram illustrating an example of a layer structure of a reflection panel.
Figure 4B:
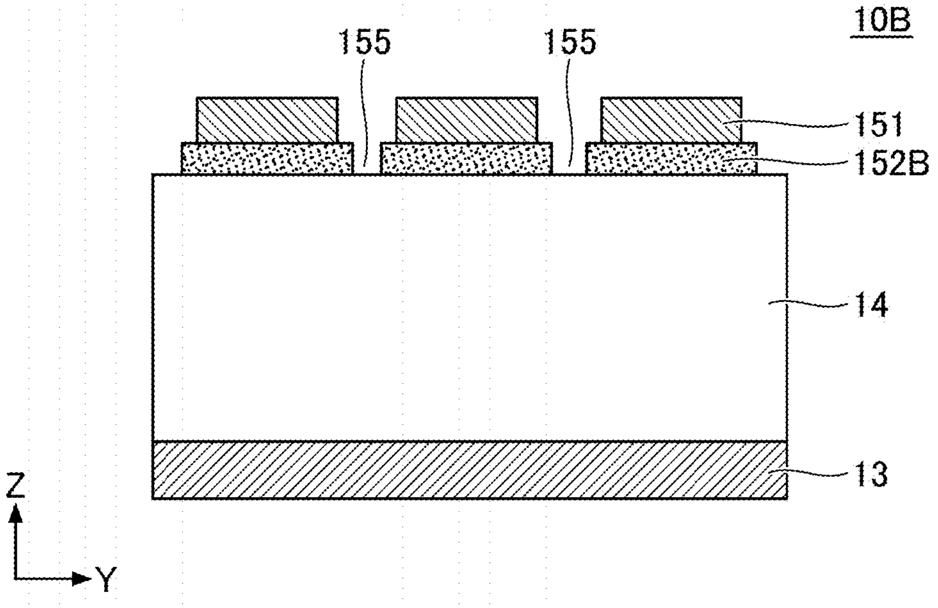
FIG. 4B is a diagram illustrating another example of a layer structure of the reflection panel.
Figure 4C:
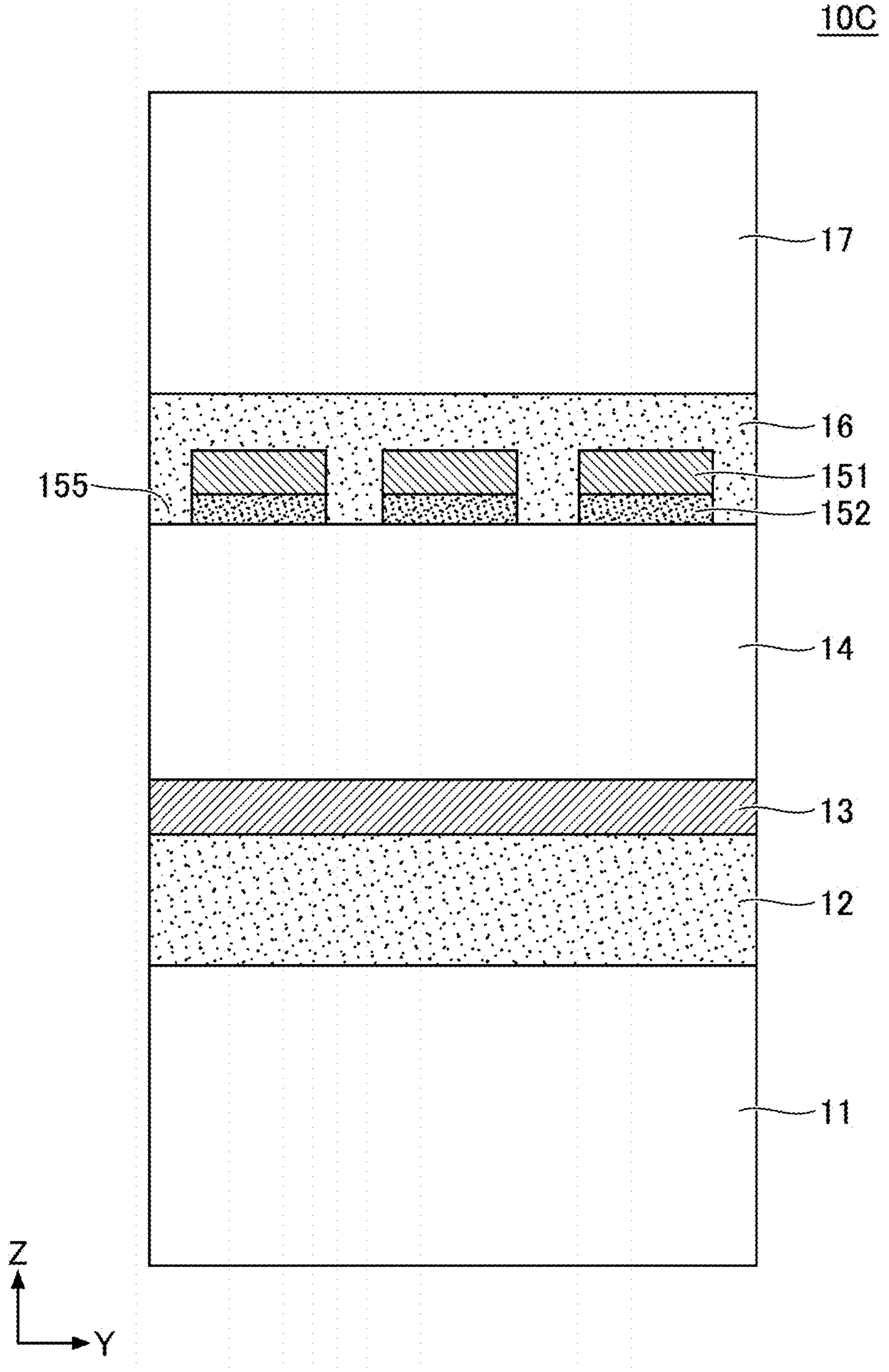
FIG. 4C is a diagram illustrating yet another example of a layer structure of the reflection panel.

FIG. 4A, FIG. 4B, and FIG. 4C illustrate examples of the layer structure of the reflection panel 10. These layer structures are a layer structure in the thickness (Z) direction of the reflection panel 10. In FIG. 4A, the reflection panel 10A includes a dielectric layer 14, a conductive pattern 151 provided on one of the surfaces of the dielectric layer 14, a ground layer 13 provided on the other of the surfaces of the dielectric layer 14, and an adhesive layer 152A for bonding the conductive pattern 151 to the dielectric layer 14. A gap 155 is provided in at least a part of the adhesive layer 152A.

The dielectric layer 14 is an insulating polymer film such as polycarbonate, cycloolefin polymer (COP), polyethylene terephthalate (PET), or fluorine resin, and has a thickness of about 0.3 mm to 1.0 mm. The dielectric layer 14 may be made of any material having a dielectric constant and a dielectric loss tangent suitable for realizing target reflection characteristics, together with the occupancy of the adhesive layer 152A.

The conductive pattern 151 forms a reflective surface of the reflection panel 10. The reflective surface constituted by the conductive pattern 151 may include a metasurface having artificially controlled reflective properties. The conductive pattern 151 of the embodiment has a periodic pattern. The conductive pattern 151 is made of a material having good conductivity, such as Cu, Ni, or Ag, and has a thickness of 10 μm or more and 50 μm or less.

The adhesive layer 152A is a material that can bond the conductive pattern 151 to the dielectric layer 14, and may be made of a thermoplastic resin, such as a vinyl acetate resin, an acrylic resin, a cellulose resin, or a silicone resin. The thickness of the adhesive layer 152A is 2 μm or more and 50 μm or less thick, and is preferably 10 μm or more and 50 μm or less thick from the viewpoint of ensuring adhesive strength. In the example of FIG. 4A, the adhesive layer 152A has substantially the same planar shape as the conductive pattern 151, and the occupancy of the adhesive layer 152A is substantially the same as the occupancy of the conductive pattern 151.

In FIG. 4B, the reflection panel 10B includes a dielectric layer 14, a conductive pattern 151 provided on one of the surfaces of the dielectric layer 14, a ground layer 13 provided on the other of the surfaces of the dielectric layer 14, and an adhesive layer 152B for bonding the conductive pattern 151 to the dielectric layer 14. Similar to FIG. 4A, a gap 155 is provided in at least a part of the adhesive layer 152B. In the example of FIG. 4B, the planar shape of the adhesive layer 152B is larger than the planar shape of the conductive pattern 151. A plurality of conductive patterns 151 may be held by one adhesive layer 152B. A difference in the occupancy between the conductive pattern 151 and the adhesive layer 152B is 0.0% or more and 40.0% or less, and preferably 0.0% or more and 35.0% or less. The difference in the occupancy of 0.0% includes a case where the pattern shapes of the conductive pattern 151 and the adhesive layer 152A coincide with each other within an allowable range of error as in FIG. 4A and a case where the occupancy within the plane is substantially the same on average even when the conductive pattern 151 and the adhesive layer 152 are shifted from each other in places. If a difference in the occupancy between the conductive pattern 151 and the adhesive layer 152B exceeds 40.0%, the occupancy of the adhesive layer 152B becomes too large, and it becomes difficult to suppress the deterioration in reflection efficiency. Furthermore, the occupancy of the conductive pattern 151 becomes too small, and it becomes difficult to realize desired reflection characteristics and reflection efficiency. For these reasons, the conductive pattern 151 and the adhesive layer 152B are adhered to each other with a difference in the occupancy in the range of 0.0% or more and 40.0% or less.

In FIG. 4C, the reflection panel 10C includes a dielectric layer 14, a conductive pattern 151 provided on one of the surfaces of the dielectric layer 14, a ground layer 13 provided on the other of the surfaces of the dielectric layer 14, and an adhesive layer 152 for bonding the conductive pattern 151 to the dielectric layer 14. The adhesive layer 152 may have substantially the same shape as the conductive pattern 151 like the adhesive layer 152A in FIG. 4A, or may have a planar shape larger than the conductive pattern 151 like the adhesive layer 152B in FIG. 4B. The reflection panel 10C also includes an intermediate layer 16 covering the conductive pattern 151 and the adhesive layer 152A, a dielectric substrate 17 bonded on the conductive pattern 151 side by the intermediate layer 16, an intermediate layer 12 covering a ground layer 13, and a dielectric substrate 11 bonded on the ground layer 13 side by the intermediate layer 12.

At least a part of the gap 155 is filled with the intermediate layer 16. The intermediate layer 16 protects the surface of the conductive pattern 151 and also adheres and holds the dielectric substrate 17. The intermediate layer 16 preferably has durability and moisture resistance, and for example, ethylene-vinyl acetate (EVA) copolymer or cycloolefin polymer (COP) can be used. The thickness of the intermediate layer 16 is 10 μm to 400 μm.

As the outermost layer of the reflection panel 10C, the dielectric substrate 17 is preferably made of a material having excellent impact resistance, durability, and transparency. The dielectric substrate 17 may be made of polycarbonate, an acrylic resin, PET, or the like. The thickness of the intermediate layer 17 is, for example, 1.0 mm to 10.0 mm.

The intermediate layer 12 protects the surface of the ground layer 13 and adheres and holds the dielectric substrate 11. The intermediate layer 12 preferably has durability and moisture resistance, and for example, ethylene-vinyl acetate (EVA) copolymer or cycloolefin polymer (COP) can be used. The thickness of the intermediate layer 12 is 10 μm to 400 μm.

As the outermost layer of the reflection panel 10C, the dielectric substrate 11 is preferably made of a material having excellent impact resistance, durability, and transparency. The dielectric substrate 11 may be made of polycarbonate, an acrylic resin, PET, or the like. The thickness of the intermediate layer 11 is, for example, 1.0 mm to 10.0 mm.

By bonding the conductive pattern 151 covered with the intermediate layer 16 to the dielectric substrate 17, the entry of moisture and air into the surface of the conductive layer 151 is suppressed, and the surface deterioration of the conductive pattern 151 is thereby suppressed. By bonding the ground layer 13 covered with the intermediate layer 12 to the dielectric substrate 11, the entry of moisture and air into the surface of the ground layer 13 is suppressed, and the surface deterioration of the ground layer 13 is thereby suppressed. Accordingly, the capacitance between the ground layer 13 and the conductive pattern 151 may be maintained to be constant, and the designed magnitude of a phase delay may be thereby maintained. In other words, the reflection efficiency of the radio waves in the designed direction can be maintained.

As long as the conductive pattern 151 can be stably bonded to the dielectric layer 14, the planar shape of the adhesive layer may be smaller than the planar shape of the conductive pattern 151, contrary to the example illustrated in FIG. 4B. In general, the conductive pattern 151 is easily peeled off if the adhesive layer is smaller than the conductive pattern 151; however, the conductive pattern 151 can be stably held by adopting the configuration illustrated in FIG. 4C. Even in this case, a difference in the occupancy between the conductive pattern 151 and the adhesive layer 152B is 0.0% or more and 40.0% or less, and preferably 0.0% or more and 35.0% or less. In a case where the conductive pattern 151 is larger than the adhesive layer 152B, if the difference in the occupancy between the conductive pattern 151 and the adhesive layer 152B exceeds 40.0%, the conductive pattern 151 may be inclined with respect to the XY plane, and it may be difficult to realize the designed reflection characteristics.

An appropriate occupancy of the conductive pattern 151 can be determined from the viewpoint of maintaining the reflection efficiency of the reflection panel 10 at 60% or more, more preferably 70% or more, and suppressing the deterioration in visible light transmittance. Specifically, the occupancy of the conductive pattern 151 with respect to the dielectric layer 14 is preferably 10.0% or more and 45% or less. If the occupancy of the conductive pattern 151 exceeds 45%, the occupancy of the adhesive layer 152 increases, and there is a possibility that good reflection efficiency cannot be maintained. In addition, the transmittance of the reflection panel 10 is deteriorated. If the occupancy of the conductive pattern 151 is less than 10.0%, it is difficult to realize reflection efficiency of 60% or more.

In the embodiment, an appropriate occupancy of the adhesive layer 152 that can suppress deterioration in reflection efficiency is examined. The reflection characteristics are evaluated by changing the occupancy of the adhesive layer of the reflection panel 10 having the above-described layer structure. Hereinafter, the term "occupancy" refers to an area occupancy.

Figure 5:
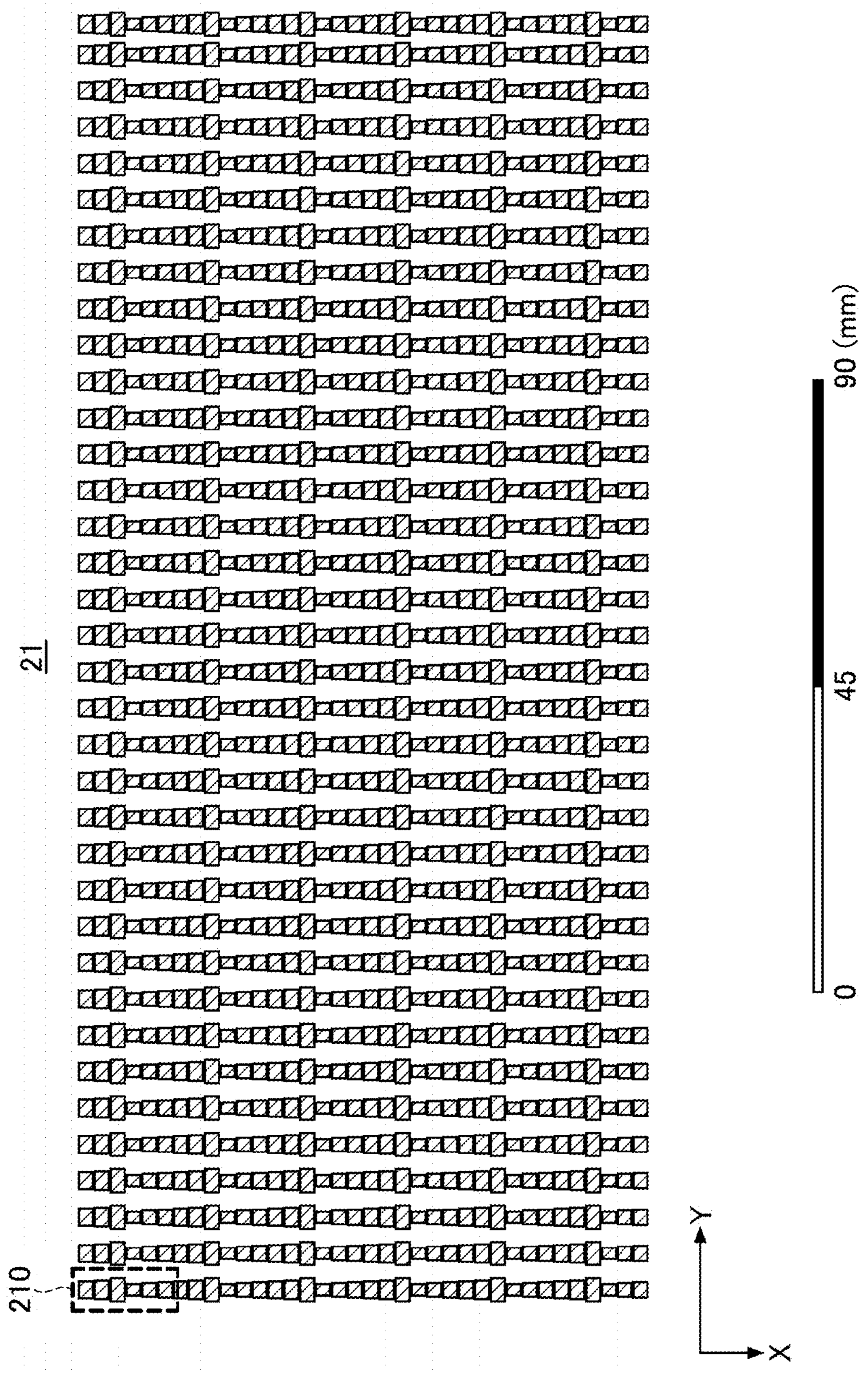
FIG. 5 is a diagram illustrating a conductive pattern model used for evaluation of reflection characteristics.

FIG. 5 is a diagram illustrating a model 21 of the conductive pattern 151 used for evaluation of the reflection characteristics of the reflection panel 10. The model 21 for evaluation includes a periodic array of unit cells (also referred to as "supercells") 210. The unit cells 210 are arranged in six rows in the X direction and 36 columns in the Y direction, and constitute a metasurface that reflects electromagnetic waves at an angle different from an angle of incidence.

Figure 6:
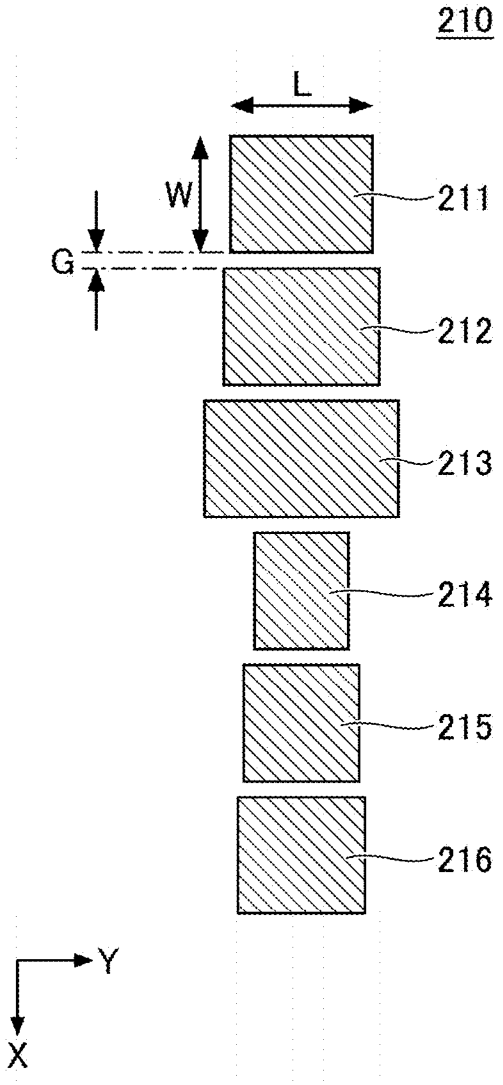
FIG. 6 is a schematic diagram illustrating a structure of a unit cell of the model illustrated in FIG. 5.

FIG. 6 is a schematic diagram illustrating the structure of the unit cell 210 of the model 21. The unit cell 210 is constituted by six metal patches 211, 212, 213, 214, 215, and 216. The width (W) direction and the length (L) direction of the metal patches 211 through 216 correspond to the width (X) direction and the height (Y) direction of the reflection panel 10 of FIG. 1, respectively. The metal patches 211 through 216 have the same width W and different lengths L but have the same central axis of the length (the Y coordinate positions of the central axis are the same). The pitch in the X direction is uniform. The phase of reflection is controlled by the shape and size of the metal patches 211 through 216, and a reflected beam is formed in a desired direction by superposition of reflected waves. In this example, each unit cell 210 is designed in such a manner that the peak of a reflected wave of a normal incidence of an electromagnetic wave (incident angle of) 0° appears in a direction of 50° from the normal.

Figure 7:
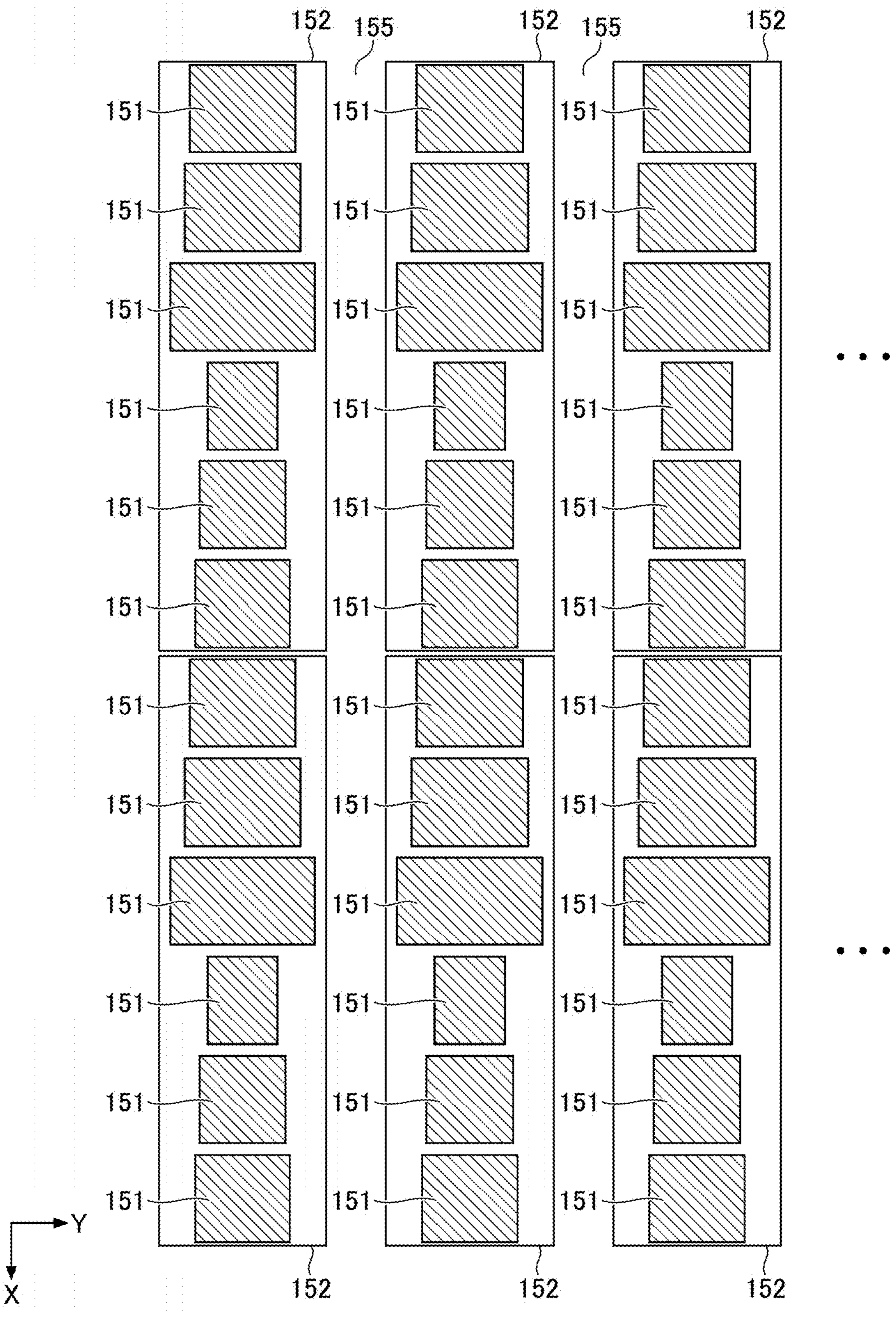
FIG. 7 is a diagram illustrating an example of the arrangement of conductive patterns on an adhesive layer.

FIG. 7 illustrates an example of the arrangement of the conductive patterns 151 on the adhesive layers 152. The unit cell 210 of FIG. 6 is constituted on the adhesive layer 152 by a plurality of conductive patterns 151 having different shapes and sizes. As illustrated in FIG. 7, one unit cell 210 may be constituted on one adhesive layer 152 by arranging a plurality of conductive patterns 151. In this case, a gap 155 is provided between the adhesive layers 152 so as to partition the unit cells 210. As long as the gap 155 is provided at a predetermined interval, the conductive patterns 151 may be arranged in such a manner that two or more unit cells 210 are formed side by side in the Y direction on one adhesive layer 152. Alternatively, the conductive patterns 151 may be arranged in such a manner that two or more unit cells 210 are formed side by side in the X direction on one adhesive layer 152.

The evaluation is conducted in the following manner: a plane wave of 28.0 GHz is made incident at an incident angle of 0°, using the conductive pattern 151 of the model 21 of FIG. 5, and the scattering cross section of the reflected wave is analyzed by general purpose three-dimensional electromagnetic field simulation software. The scattering cross section, namely a radar cross section (RCS), is used as an indicator of the ability to reflect incident electromagnetic waves.

For the case of a metasurface that reflects an incident wave at a reflection angle different from an angle of incidence, calculated power reflection efficiency needs to be corrected. An ideal conductive plate is perfectly specular and reflects electromagnetic waves in the same direction for normal incidence, whereas a metasurface reflects electromagnetic waves in a direction different from an angle of incidence. The power reflection efficiency of the metasurface is obtained by dividing the power reflection efficiency calculated from a gain value by a correction value.

If a reflected electric field in the metasurface without loss determined by the model pattern of FIG. 5 is $E_{MR}$, and a reflected electric field in the ideal conductive plate is $E_{PEC}$, the correction value $\varepsilon_p$ is $|E_{MR}/E_{PEC}|^2$. $|E_{MR}/E_{PEC}|$ can be expressed as follows:

$$\left|\frac{E_{MR}}{E_{PEC}}\right| = \frac{\sqrt{|\cos\theta|}}{|\cos\varphi|} \quad \text{[Math. 1]}$$

or $$\left|\frac{E_{MR}}{E_{PEC}}\right| = \frac{\sqrt{|\cos\theta_i \cdot \cos\theta_r|}}{|\cos\varphi|} \quad \text{[Math. 2]}$$

where θ is an angle of incidence on the metasurface, and φ is a corresponding angle of reflection in the case of regular reflection. If the angle of reflection θ on the metasurface is 50° (or θr=) 50°, the angle of incidence θi is 0°, and the angle of reflection φ for the regular reflection is 25°, the correction value Ep is 0.7826.

Figure 8:
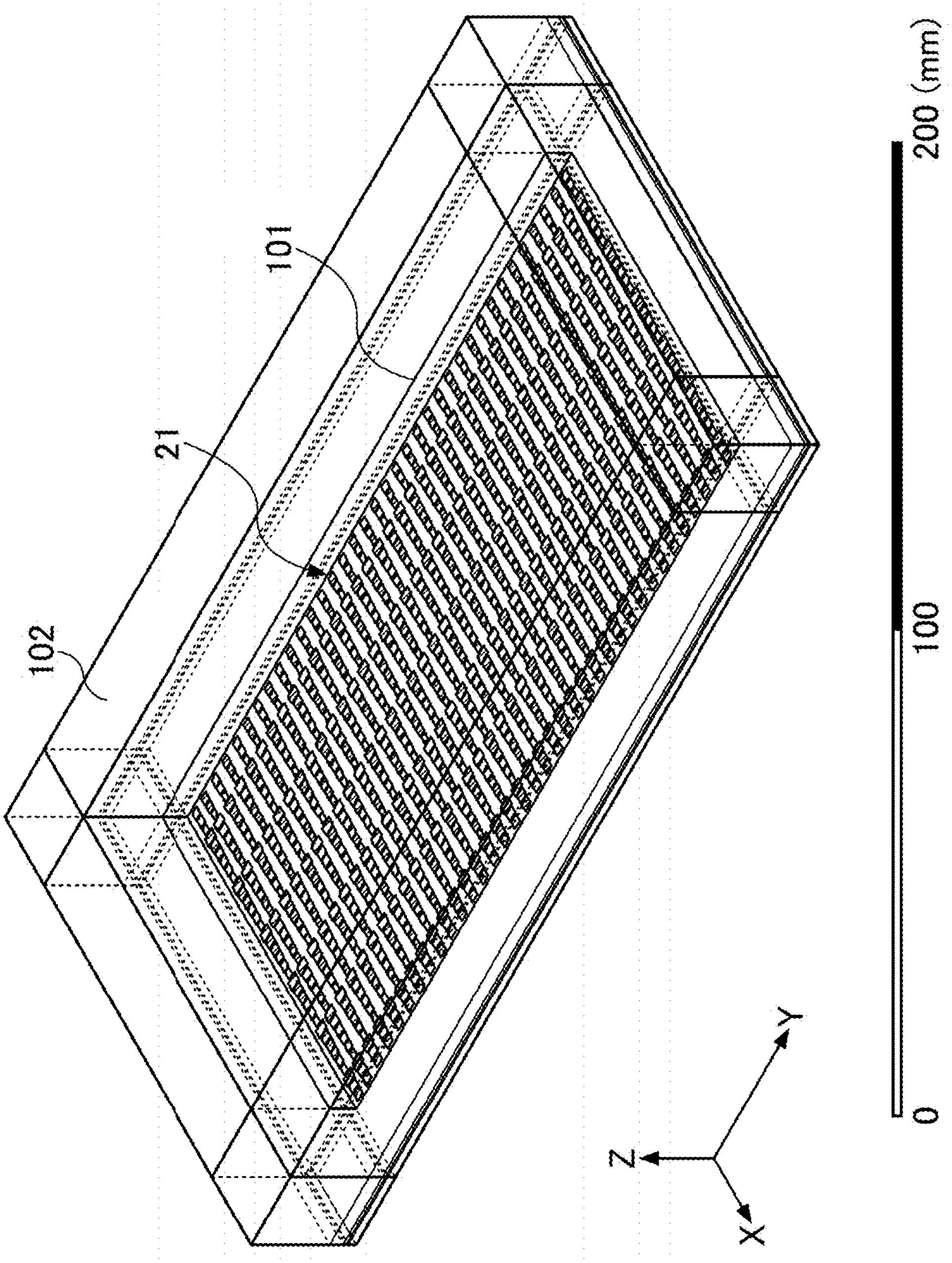
FIG. 8 is a diagram illustrating an analysis space.

FIG. 8 illustrates an analysis space 101 of the electromagnetic wave simulation. Defining the thickness direction of the layer structure of the reflection panel 10 as the Z direction, the width direction of the metal patch of the model 21 in FIG. 5 as the X direction, and the length direction as the Y direction, the analysis space is expressed as (a dimension in the X direction)×(a dimension in the Y direction)×(a dimension in the Z direction). Suppose the dimensions of the analysis space 101 are 83.9 mm×192.6 mm×3.7 mm if the incident electromagnetic wave has a frequency of 28.0 GHz. The boundary condition is designed on an assumption that the electromagnetic wave absorber 102 is arranged around the analysis space 101.

Figure 9A:
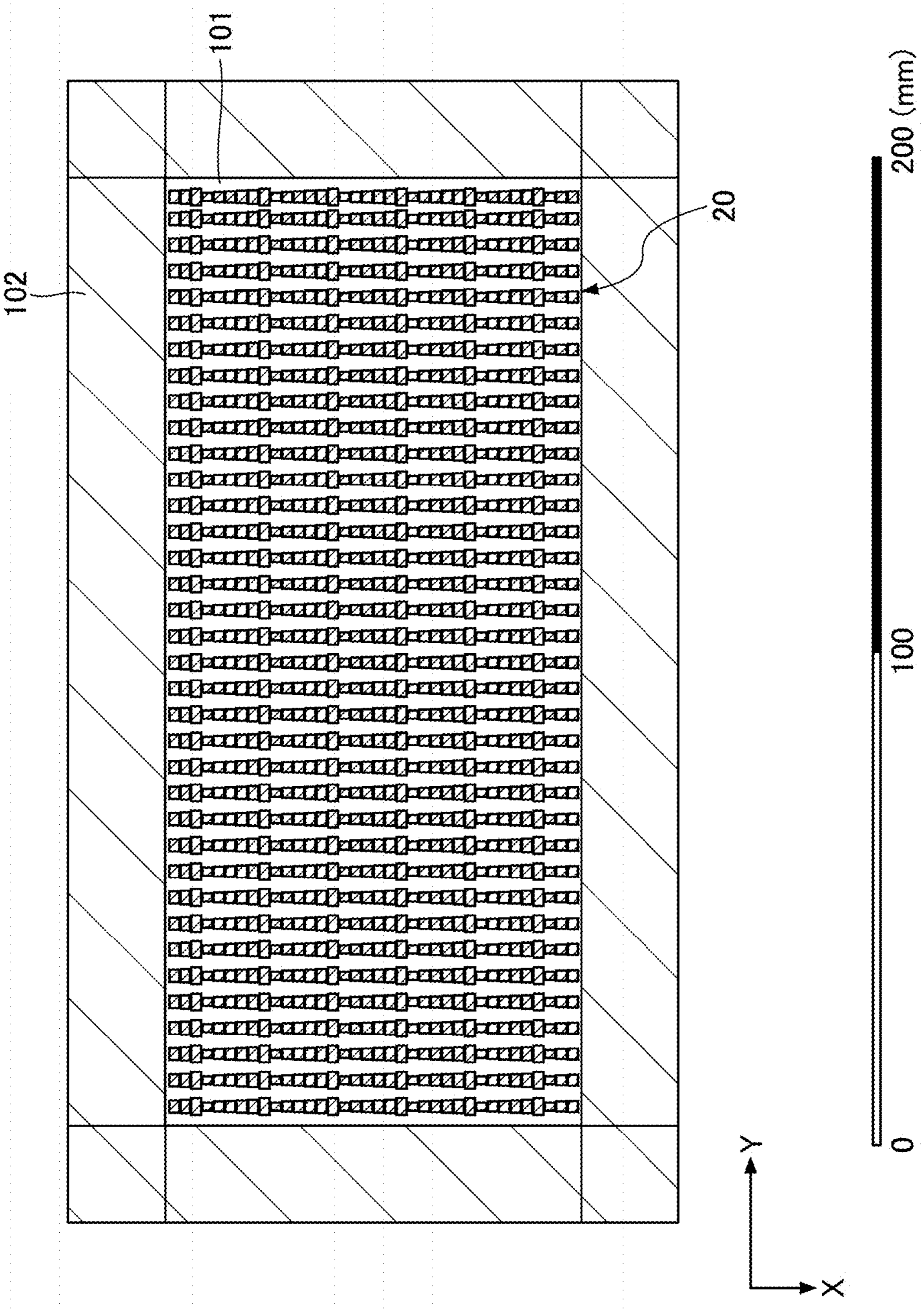
FIG. 9A is a schematic diagram of an XY plane of the analysis space.
Figure 9B:
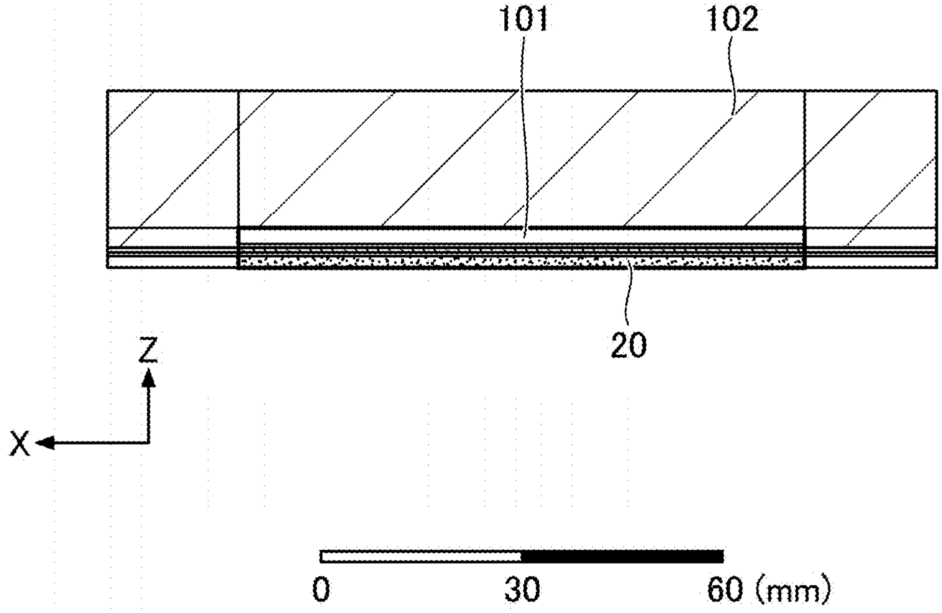
FIG. 9B is a schematic diagram of an XZ plane of the analysis space.
Figure 9C:
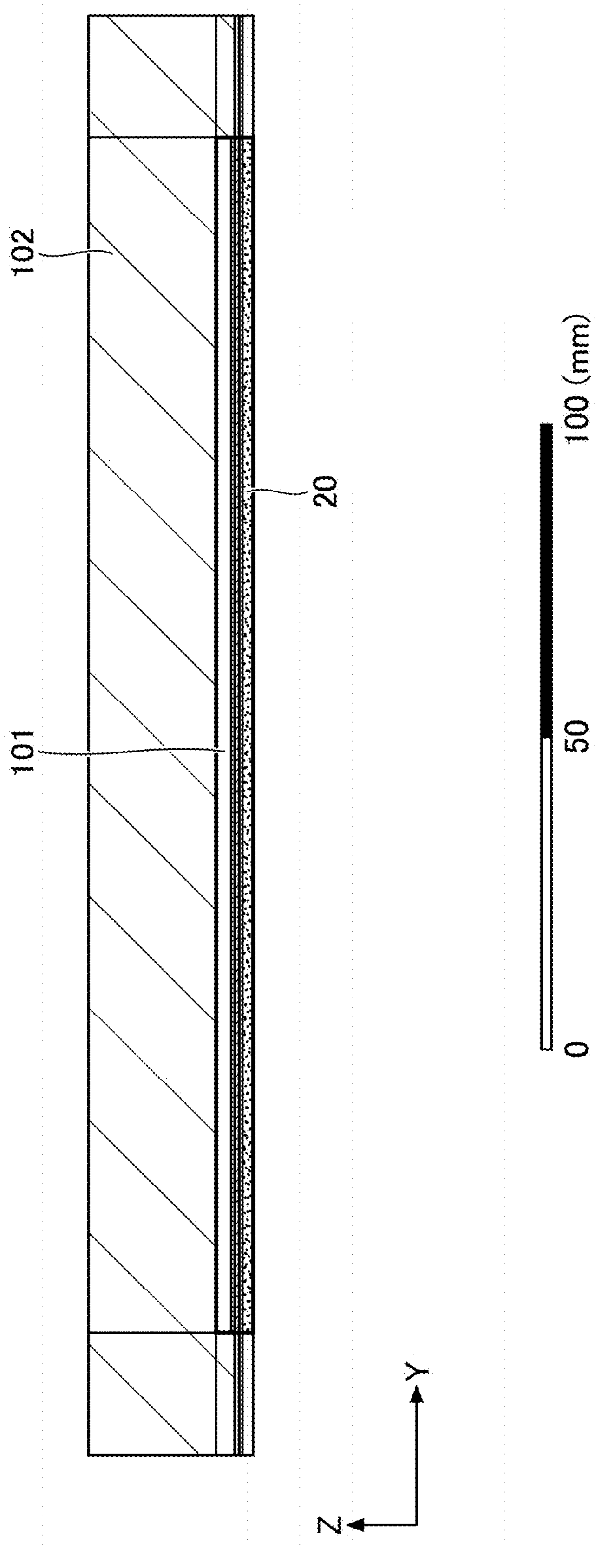
FIG. 9C is a schematic diagram of a YZ plane of the analysis space.

FIG. 9A is a schematic diagram of the XY plane of the analysis space 101 surrounded by the electromagnetic absorber 102, FIG. 9B is a schematic diagram of the XZ plane of the analysis space 101, and FIG. 9C is a schematic diagram of the YZ plane of the analysis space 101. The power reflection efficiency is calculated by changing the occupancy of the adhesive layer 152 supporting the conductive pattern 151 in the analysis space 101. Assume that the conductive patterns 151 used in the simulation are all common. Six conductive patterns 151 constituting the unit cell 210 are formed in a rectangular shape having a uniform width W of 0.4 mm, and lengths L are set to 2.9751 mm, 3.0739 mm, 3.7536 mm, 2.0344 mm, 2.7300 mm, and 2.8497 mm, respectively. The center-to-center distance (pitch) between the metallic patches in the X direction is uniformly 1.9283 mm.

Example 1

A polycarbonate film having a thickness of 0.7 mm is used as the dielectric layer 14. The ground layer 13 is set on one surface of the polycarbonate film by using an Ag-based multilayer film having a thickness of 0.36 mm. On the other surface of the polycarbonate film, the conductive pattern 151 having a thickness of 0.05 mm is arranged, with the adhesive layer 152 having a thickness of 0.01 mm and an occupancy of 9.2% interposed therebetween. As the adhesive layer 152, an acrylic resin having a relative dielectric constant of 2.39 and a dielectric loss tangent of 0.05 at the frequency of 28.0 GHZ. The conductive pattern 151 is made of a copper foil having a thickness of 0.05 mm and has the above-described pattern shape. The gain value (a peak value of a reflected waveform) at 50° in the RCS plot in the case where a plane wave of 28.0 GHz incident at an angle of incidence of 0° is reflected at an angle of reflection of 50° is 10.2930 dB. The power reflection efficiency after correcting this gain value with the correction value $\varepsilon_p$=0.7826 is 73.7%. With the occupancy of the adhesive layer 152 of Example 1, a power reflection efficiency of 70% or more can be achieved.

Example 2

In Example 2, the layer structure is the same as that of Example 1 but the occupancy of the adhesive layer 152 is changed. Specifically, a polycarbonate film having a thickness of 0.7 mm is used as the dielectric layer 14. The ground layer 13 is set on one surface of the polycarbonate film by using an Ag-based multilayer film having a thickness of 0.36 mm. On the other surface of the polycarbonate film, the conductive pattern 151 having a thickness of 0.05 mm is arranged, with the adhesive layer 152 having a thickness of 0.01 mm and an occupancy of 11.5% interposed therebetween. The adhesive layer 152 is an acrylic resin having a relative dielectric constant of 2.39 and a dielectric loss tangent of 0.05 at the frequency of 28.0 GHZ. The conductive pattern 151 is made of a copper foil having a thickness of 0.05 mm and has the above-described pattern shape. The gain value (a peak value of a reflected waveform) at 50° in the RCS plot in the case where a plane wave of 28.0 GHz incident at an angle of incidence of 0° is reflected at an angle of reflection of 50° is 11.4780 dB. The power reflection efficiency after correcting this gain value with the correction value $\varepsilon_p$=0.7826 is 76.9%. With the occupancy of the adhesive layer 152 of Example 2, a power reflection efficiency of 75% or more can be achieved.

Example 3

In Example 3, the layer structure is the same as that of Examples 1 and 2 but the occupancy of the adhesive layer 152 is changed. Specifically, a polycarbonate film having a thickness of 0.7 mm is used as the dielectric layer 14. The ground layer 13 is set on one surface of the polycarbonate film by using an Ag-based multilayer film having a thickness of 0.36 mm. On the other surface of the polycarbonate film, the conductive pattern 151 having a thickness of 0.05 mm is arranged, with the adhesive layer 152 having a thickness of 0.01 mm and an occupancy of 23.0% interposed therebetween. The adhesive layer 152 is an acrylic resin having a relative dielectric constant of 2.39 and a dielectric loss tangent of 0.05 at the frequency of 28.0 GHz. The conductive pattern 151 is made of a copper foil having a thickness of 0.05 mm and has the above-described pattern shape. The gain value (a peak value of a reflected waveform) at 50° in the RCS plot in the case where a plane wave of 28.0 GHZ incident at an angle of incidence of 0° is reflected at an angle of reflection of 50° is 11.4530 dB. The power reflection efficiency after correcting this gain value with the correction value $\varepsilon_p$=0.7826 is 76.4%. With the occupancy of the adhesive layer 152 of Example 3, a power reflection efficiency of 76% or more can be achieved.

Example 4

In Example 4, the layer structure is the same as that of Example 1 through 3 but the occupancy of the adhesive layer 152 is changed. A polycarbonate film having a thickness of 0.7 mm is used as the dielectric layer 14. The ground layer 13 is set on one surface of the polycarbonate film by using an Ag-based multilayer film having a thickness of 0.36 mm. On the other surface of the polycarbonate film, the conductive pattern 151 having a thickness of 0.05 mm is arranged, with the adhesive layer 152 having a thickness of 0.01 mm and an occupancy of 35.5% interposed therebetween. The adhesive layer 152 is an acrylic resin having a relative dielectric constant of 2.39 and a dielectric loss tangent of 0.05 at the frequency of 28.0 GHZ. The conductive pattern 151 is made of a copper foil having a thickness of 0.05 mm and has the above-described pattern shape. The gain value (a peak value of a reflected waveform) at 50° in the RCS plot in the case where a plane wave of 28.0 GHz incident at an angle of incidence of 0° is reflected at an angle of reflection of 50° is 11.5220 dB. The power reflection efficiency after correcting this gain value with the correction value $\varepsilon_p$=0.7826 is 77.7%. With the occupancy of the adhesive layer 152 of Example 4, a power reflection efficiency of 77% or more can be achieved.

Example 5

In Example 5, the layer structure is the same as that of Examples 1 through 4 but the occupancy of the adhesive layer 152 is changed. A polycarbonate film having a thickness of 0.7 mm is used as the dielectric layer 14. The ground layer 13 is set on one surface of the polycarbonate film by using an Ag-based multilayer film having a thickness of 0.36 mm. On the other surface of the polycarbonate film, the conductive pattern 151 having a thickness of 0.05 mm is arranged, with the adhesive layer 152 having a thickness of 0.01 mm and an occupancy of 46.0% interposed therebetween. The adhesive layer 152 is an acrylic resin having a relative dielectric constant of 2.39 and a dielectric loss tangent of 0.05 at the frequency of 28.0 GHz. The conductive pattern 151 is made of a copper foil having a thickness of 0.05 mm and has the above-described pattern shape. The gain value (a peak value of a reflected waveform) at 50° in the RCS plot in the case where a plane wave of 28.0 GHz incident at an angle of incidence of 0° is reflected at an angle of reflection of 50° is 11.4940 dB. The power reflection efficiency after correcting this gain value with the correction value $\varepsilon_p$=0.7826 is 77.2%. With the occupancy of the adhesive layer 152 of Example 5, a power reflection efficiency of 77% or more can be achieved.

Comparative Example 1

In Comparative Example 1, the same layer structure as that of Examples 1 through 5, the adhesive layer 152 having the same thickness as those in Example 1-5 and the same conductive pattern 151 as that of Examples 1 through 5 are used, but the occupancy of the adhesive layer 152 is set to 100%. This corresponds to a configuration in which the entire one surface of the dielectric layer 14 is covered with the adhesive layer 152. A polycarbonate film having a thickness of 0.7 mm is used as the dielectric layer 14. The ground layer 13 is set on one surface of the polycarbonate film by using an Ag-based multilayer film having a thickness of 0.36 mm. On the other surface of the polycarbonate film, the conductive pattern 151 is arranged, with the adhesive layer 152 having a thickness of 0.01 mm and an occupancy of 100.0% interposed therebetween. The adhesive layer 152 is an acrylic resin having a relative dielectric constant of 3.01 and a dielectric loss tangent of 0.08 at the frequency of 28.0 GHz. The conductive pattern 151 is made of a copper foil having a thickness of 0.05 mm and has the above-described pattern shape. The gain value (a peak value of a reflected waveform) at 50° in the RCS plot in the case where a plane wave of 28.0 GHz incident at an angle of incidence of 0° is reflected at an angle of reflection of 50° is 9.9770 dB. The power reflection efficiency after correcting this gain value with the correction value $\varepsilon_p$=0.7826 is 54.4%. With the occupancy of the adhesive layer 152 of Comparative Example 1, a power reflection efficiency of 60% or more cannot be achieved.

It is understood from Examples 1 to 5 and Comparative Example 1 that it is preferable that the adhesive layer 152 preferably does not cover the entire surface of the dielectric layer 14 in order to maintain the power reflection efficiency at 60% or more, more preferably 70% or more. Deterioration in power reflection efficiency can be suppressed by providing the gap 155 in at least a part of the adhesive layer 152. This is considered to be because the influence of the adhesive layer 152 on the dielectric layer 14 can be reduced. The power reflection efficiency is maintained at 70% or more by setting the occupancy of the adhesive layer 152 to 9.0% or more and 50.0% or less in the case where the thickness of the adhesive layer 152 is 0.02 μm or more and 0.05 μm or less.

Within the above range of the occupancy of the adhesive layer 152, the occupancy of the conductive pattern 151 with respect to the dielectric layer 14 may be set to 10.0% or more and 45% or less in the case where the conductive pattern 151 is 0.01 mm or more and 0.05 mm or less.

The range of the occupancy of the adhesive layer 152 partially provided on the surface of the dielectric layer 14 also applies to the configuration of FIG. 4C. In other words, the adhesive layer 152 provided at the occupancy rate of 9.0% or more and 50% or less and the conductive pattern 151 on the adhesive layer 152 may be covered with the intermediate layer 16. By covering the conductive pattern 151 and the adhesive layer 152 with the intermediate layer 16, it is possible to suppress a change in the surface state of the conductive pattern 151 due to the influence of oxygen, moisture, or the like, and weather resistance is therefore improved.

In the case where the dielectric substrate 17 is bonded to the conductive pattern 151 by the intermediate layer 16, the intermediate layer 16 improves the impact resistance and durability of the reflection panel 10. In this case, the thickness of the intermediate layer 16 may be a thickness that can secure moisture resistance and protection for the conductive pattern 151 and is capable of bonding the dielectric substrate 17. For example, an adhesive film having a thickness of 10 μm or more and 400 μm or less can be used as the intermediate layer 16. The same applies to the intermediate layer 12 provided on the ground layer 13 side.

The outermost dielectric substrate 17 may be any substrate that is transparent to frequencies used, highly transparent to visible light, and highly durable, and the thickness thereof is preferably 1.0 mm to 5.0 mm, and more preferably 1.0 mm to 3.0 mm, so that the reflection panel 10 does not become too thick and heavy. The same applies to the dielectric substrate 11 provided on the ground layer 13 side.

The electromagnetic wave reflecting device of the embodiment is not limited to the foregoing configuration example. In Examples 1 through 5, the calculation is conducted on the assumption that the acrylic resin having a specific relative dielectric constant and a specific dielectric loss tangent is used as the adhesive layer 152; however, the occupancy of the adhesive layer 152 (9.0% or more and 50.0% or less) is also applicable to a case where a general adhesive having a relative dielectric constant of 2.0 or more and 4.5 or less and a dielectric loss tangent of 0.10 or less is used. The range of the occupancy of the adhesive layer 152 is valid over the range of 1 GHz to 28 GHZ±4 GHz. The reflection angle with respect to the normal incidence can be appropriately designed in a range of 35° or more and less than 90° by designing the size, shape, and pitch of the conductive pattern 151 and the dielectric constant of the dielectric layer 14. The in-plane size of the reflection panel 10 of the electromagnetic wave reflecting device can be selected as appropriate within a range from 30 cm×30 cm to 3 m×3 m. The entire surface of the reflection panel 10 may be a metasurface, or a part of the reflection panel 10 may be a metasurface and the remaining part may be a specular reflection surface. In this case, the dielectric substrate may be bonded to the reflective surface after covering the entire surface of the reflective surface with an adhesive film (intermediate layer) having high moisture resistance and durability. In the case where a metasurface provided on a part or all of the reflecting surface is formed, a gap 155 is provided so that the adhesive layer 152 supporting the conductive pattern 151 is not continuous on the entire surface of the dielectric layer 14. At this time, the occupancy of the adhesive layer 152 with respect to the dielectric layer 14 may be set to 9.0% or more and 50.0% or less. The electromagnetic wave reflecting device 60 and the electromagnetic wave reflecting fence of the embodiment can be installed indoors or outdoors.

The invention claimed is:

1. An electromagnetic wave reflecting device, comprising:

a reflection panel configured to reflect radio waves of a desired band selected from a frequency band between 1 GHz and 170 GHz; and a frame configured to hold the reflection panel, wherein the reflection panel includes a dielectric layer, a conductive pattern periodically provided on one surface of the dielectric layer, a ground layer provided on the other surface of the dielectric layer, and an adhesive layer configured to bond the conductive pattern to the one surface of the dielectric layer, and a gap is provided in the adhesive layer, wherein a thickness of the adhesive layer is 0.002 mm or more and 0.05 mm or less, and an occupancy of the adhesive layer with respect to the dielectric layer is 9.0% or more and 50.0% or less.

2. The electromagnetic wave reflecting device according to claim 1, wherein a thickness of the conductive pattern is 0.01 mm or more and 0.05 mm or less, and an occupancy of the conductive pattern with respect to the dielectric layer is 10.0% or more and 45.0% or less.

3. The electromagnetic wave reflecting device according to claim 2, wherein the adhesive layer and the conductive pattern are adhered to each other, and a difference in the occupancy is 0.0% or more and 40.0% or less.

4. The electromagnetic wave reflecting device according to claim 1, further comprising:

an intermediate layer covering the adhesive layer and the conductive pattern, wherein the intermediate layer fills at least a part of the gap of the adhesive layer.

5. The electromagnetic wave reflecting device according to claim 4, further comprising:

a dielectric substrate bonded on a conductive pattern side by the intermediate layer.

6. An electromagnetic wave reflecting fence, wherein a plurality of the electromagnetic wave reflecting devices each being the electromagnetic wave reflecting device of claim 1 are joined by the frame.

7. The electromagnetic wave reflecting fence according to claim 6, wherein at least a part of the reflection panel is a metasurface at which an angle of incidence differs from an angle of reflection.

8. An electromagnetic wave reflecting device, comprising:

a reflection panel configured to reflect radio waves of a desired band selected from a frequency band between 1 GHz and 170 GHz; and a frame configured to hold the reflection panel, wherein the reflection panel includes a dielectric layer, a conductive pattern periodically provided on one surface of the dielectric layer, a ground layer provided on the other surface of the dielectric layer, and an adhesive layer configured to bond the conductive pattern to the one surface of the dielectric layer, an intermediate layer covering the adhesive layer and the conductive pattern, and a gap is provided in the adhesive layer, wherein the intermediate layer fills at least a part of the gap of the adhesive layer.

9. The electromagnetic wave reflecting device according to claim 8, further comprising:

a dielectric substrate bonded on a conductive pattern side by the intermediate layer.

10. An electromagnetic wave reflecting fence, wherein a plurality of the electromagnetic wave reflecting devices each being the electromagnetic wave reflecting device of claim 8 are joined by the frame.

11. The electromagnetic wave reflecting fence according to claim 10, wherein at least a part of the reflection panel is a metasurface at which an angle of incidence differs from an angle of reflection.

* * * * *